US006832205B1

(12) United States Patent
Aragones et al.

(10) Patent No.: US 6,832,205 B1
(45) Date of Patent: Dec. 14, 2004

(54) SYSTEM AND METHOD FOR AUTOMATICALLY PREDICTING THE TIMING AND COSTS OF SERVICE EVENTS IN A LIFE CYCLE OF A PRODUCT

(75) Inventors: James Kenneth Aragones, Clifton Park, NY (US); Jeffrey William Stein, East Greenbush, NY (US); Amy Victoria Aragones, Clifton Park, NY (US); William Talbert Tucker, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 803 days.

(21) Appl. No.: 09/608,628

(22) Filed: Jun. 30, 2000

(51) Int. Cl.$^7$ .............................................. G06F 17/60
(52) U.S. Cl. ............................. 705/10; 705/7; 705/11; 703/6
(58) Field of Search .................. 705/10, 11; 702/90, 702/33, 179; 703/6, 7, 8

(56) References Cited

U.S. PATENT DOCUMENTS

| | | | |
|---|---|---|---|
| 5,455,777 A | | 10/1995 | Fujiyama et al. |
| 5,608,845 A | * | 3/1997 | Ohtsuka et al. ............... 706/45 |
| 5,686,359 A | | 11/1997 | Meester et al. |
| 5,701,471 A | | 12/1997 | Subramanyam |
| 5,740,233 A | | 4/1998 | Cave et al. |
| 5,748,508 A | | 5/1998 | Baleanu |
| 5,822,218 A | | 10/1998 | Moosa et al. |
| 6,067,486 A | | 5/2000 | Aragones et al. |
| 6,132,969 A | | 10/2000 | Stoughton et al. |
| 6,195,624 B1 | | 2/2001 | Woodman et al. |
| 6,230,095 B1 | | 5/2001 | Wang |
| 6,370,454 B1 | | 4/2002 | Moore |
| 6,377,876 B1 | | 4/2002 | Hedeen et al. |
| 6,381,556 B1 | * | 4/2002 | Kazemi et al. ............. 702/182 |
| 6,405,160 B1 | | 6/2002 | Djaja et al. |
| 6,408,258 B1 | | 6/2002 | Richer |
| 6,490,506 B1 | | 12/2002 | March |
| 6,532,427 B1 | * | 3/2003 | Joshi et al. .................. 702/84 |
| 2001/0020229 A1 | | 9/2001 | Lash |
| 2002/0035570 A1 | | 3/2002 | Kozam et al. |

FOREIGN PATENT DOCUMENTS

| | | |
|---|---|---|
| EP | 0867841 A2 | 9/1998 |
| JP | 2000097814 | 7/2000 |
| WO | WO 98/24042 | 6/1998 |

OTHER PUBLICATIONS

"Handbook of Mathematical Sciences", by William H. Beyer, 5th Edition, 1978, ISBN 0–8493–0655–8, pp. 730–731.*

"Handbook of Simulation", by Jerry Banks, John Wiley & Sons, Inc., Aug. 1998, ISBN 0–471–13403–1, pp. 15–18.*

(List continued on next page.)

*Primary Examiner*—Romain Jeanty
(74) *Attorney, Agent, or Firm*—David C. Goldman; Patrick K. Patnode (57) ABSTRACT

A system and method for automatically predicting timing and costs of future service events in a life cycle of a product. A database contains a plurality of service information and performance information for the product. A statistical analyzer automatically analyzes the plurality of processed service information to determine a plurality of compartment failure information. A performance deterioration rate analyzer automatically analyzes the performance deterioration rate of the product from the plurality of service information and performance information. A simulator, automatically simulates a distribution of future service events in the life cycle of the product and predicts the costs of the service events according to the plurality of compartment failure information and the performance deterioration rate analysis.

61 Claims, 9 Drawing Sheets

OTHER PUBLICATIONS

Robb (Performance Analysis Case Study: Application of Experimental Design & Statistical Data Analysis Techniques), 1991, ACM, pp. 214–215.*

Steve (On the Accuracy of Predicting Rate Monotonic Scheduling Performance), 1990, ACM 0–89791–409, pp. 244–253.*

Kim (A Forecasting Methodology For Maintenance Cost of Long–Life Equipment), 1989; Dialog file 148, Accession No. 06498062.*

Mark Kaminskly, et al, "A Monte Carlo Approach to Warranty Repair Predictions", SAE Paper Series 97258, Reliability, Maintainability, Supportability & Logistics., Dallas, TX, Jun. 1997,pp. 1–5.

T. Douglas Cribbes, "Changes in Engine Maintenance Management", Aerospace Engineering, Dec. 1997, pp. 7–9.

J. Endrenyl, et al, "Probabilistic Evaluation of the Effect of Maintenance on Reliability—an Application", IEEE Trans. on Power Systems, vol. 13, No. 2, May 1998, pp. 576–583.

"Forecasting Engine Removals and Shop Visits", Aircraft Technology Engineering & Maintenance Engine Yearbook 1996–1997, pp. 74–77.

Karen L. Butler, "An Expert System Based Framework for an Incipient Failure Detection and Predictive; Maintenance System", 1996, IEEE, pp. 321–326.

O. Geoffrey Okogbaa, et al, "Time Series Intervention Analysis for Preventive/Predictive Maintenance Management of Multiunit Systems", 1998 IEEE, pp. 4659–4664.

R. Gatland, et al "Solving Engine Maintenance Capacity Problems With Simulation", Proceedings of the 1997 Winter Simulation Conference, pp. 892–899.

Aerospace Engineering/Dec. 1997, "Changes in Engine Maintenance Management", pp. 7–9.

Aircraft Technology Engineering & Maintenance Engine Yearbook 1996–1997, "Forecasting Engine Removals and Shop Visits", pp 74–77.

M. Kaminsky, et al, "A Monte Carlo Approach to Warranty Repair Predictions", Reliability, Maintainability, Supportability & Logistics, Dallas, TX, 1997, pp. 1–5.

* cited by examiner

SYSTEM AND METHOD FOR AUTOMATICALLY PREDICTING THE TIMING AND COSTS OF SERVICE EVENTS IN A LIFE CYCLE OF A PRODUCT

BACKGROUND OF THE INVENTION

This disclosure relates generally to servicing products and systems and more particularly to automatically predicting the timing and costs of future service events of a product or a system.

The market for long-term contractual agreements has grown at high rates over recent years for many of today's service organizations. As the service organizations establish long-term contractual agreements with their customers, it becomes important to understand the expected costs and risks associated with the pricing of service contracts and portfolio management of the contracts. In addition, the service organizations need to have an understanding of the planning of repairs (shop workload planning) and how the introduction of new technology will affect their service contracts. In order to analyze these issues, it is necessary to correctly model the underlying behavior of the product or system so that each can be serviced in the most cost-effective manner.

Currently available analytical practices are unable to accurately model service requirements for complex products or systems. Typically, these models contain poor cost information which result in the service organization inefficiently managing the risk associated with their service portfolios, failing to respond to customer needs and new technology, which all lead to lower long-term contract profitability. A standard time-series method is one particular approach that has been used to model the service requirements of repairable systems such as aircraft engines, automobiles, locomotives and other high tech products. This time-series method examines historical data obtained over a five to ten year period and forms a trend line on either system costs and/or number of repairs made to the system. The trend line is then used to predict future costs and number of repairs. A limitation with this time series method is that it does not give details of failures at a compartmental level. A compartment is a physical or performance related sub-system of the repairable product, which when it fails causes the product to require maintenance or servicing. Other limitations with the standard time series method is that it does not account for the life cycle of the repairable product and thus does not provide a distribution of the expected service events for the product. An analysis based on engineering relationships to determine compartment parameters is another method used to model the service requirements of repairable systems. A limitation with this analysis is that it is not well based in underlying statistics, and thus cannot be shown to accurately model the repairable product on an ongoing basis.

In order to overcome the above problems, there is a need for an approach that can model the service requirements of repairable systems that is accurate and has a comprehensive statistical framework. Such an approach will lead to better cost projections, more realistic and effective risk management, new technology introduction and day-to-day service that is more responsive to customer needs and higher long-term contract profitability.

BRIEF SUMMARY OF THE INVENTION

In accordance with one embodiment of this disclosure, there is an automated system for predicting the timing and costs of future service events in a life cycle of a product formed from a plurality of compartments. The system comprises a database that contains a plurality of service information and a plurality of performance information for the product. A statistical analyzer automatically analyzes the plurality of service information to determine a plurality of compartment failure information. A performance deterioration rate automatically analyzes performance deterioration rate of the product from the plurality of service information and performance information. A simulator, automatically simulates a distribution of future service events in the life cycle of the product and predicts the costs of the service events according to the plurality of compartment failure information and the performance deterioration rate analysis.

Similarly, in this disclosure there is a method for automatically predicting the timing and costs of future service events in a life cycle of a product formed from a plurality of compartments. The method comprises storing a plurality of service information and a plurality of performance information for the product; automatically analyzing the plurality of service information to determine a plurality of compartment failure information; automatically performing a deterioration rate analysis that determines performance deterioration rate of the product from the plurality of service information and performance information; and automatically simulating a distribution of future service events in the life cycle of the product and predicting the costs of the service events according to the plurality of compartment failure information and the performance deterioration rate analysis.

Also, in this disclosure there is a computer-readable medium storing computer instructions for instructing a computer system to automatically predict the timing and costs of future service events in a life cycle of a product formed from a plurality of compartments. The computer instructions comprise storing a plurality of service information and a plurality of performance information for the product; automatically analyzing the plurality of service information to determine a plurality of compartment failure information; automatically performing a deterioration rate analysis of the product from the plurality of service information and performance information and automatically simulating a distribution of future service events in the life cycle of the product and predicting the costs of the service events according to the plurality of compartment failure information and the performance deterioration rate analysis.

DETAILED DESCRIPTION OF THE INVENTION

Figure 1:
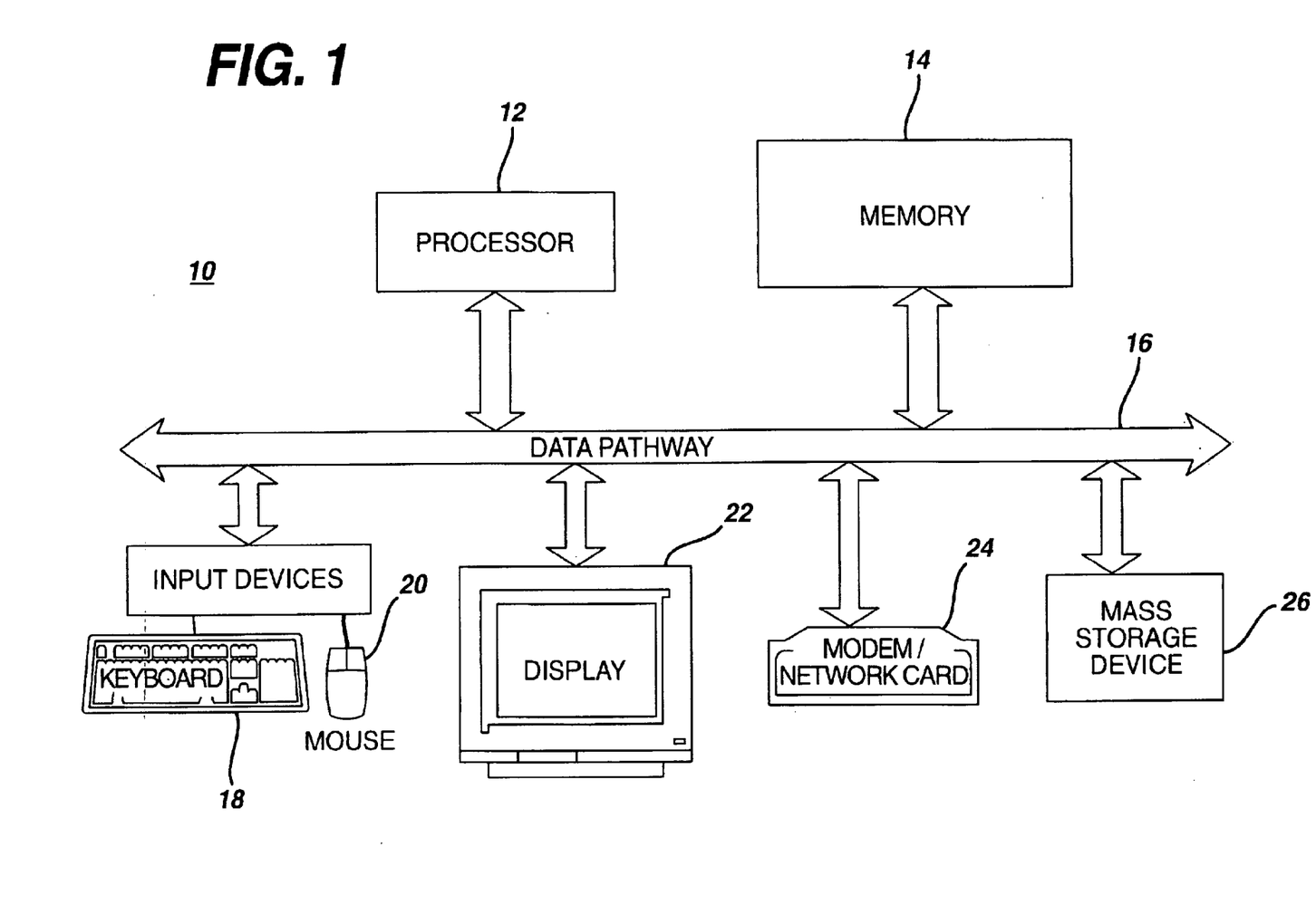
FIG. 1 shows a schematic of a general purpose computer system in which a system for automatically predicting the timing and costs of future service events of a product operates.

FIG. 1 shows a schematic of a general-purpose computer system 10 in which a system for automatically predicting the timing and costs of future service events of a product operates. The computer system 10 generally comprises a processor 12, a memory 14, input/output devices, and data pathways (e.g., buses) 16 connecting the processor, memory and input/output devices. The processor 12 accepts instructions and data from the memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices.

The input/output devices comprise a keyboard 18 and a mouse 20 that are used to enter data and instructions into the computer system 10. A display 22 allows a user to see what the computer has accomplished. Other output devices could include a printer, plotter, synthesizer and speakers. A modem or network card 24 enables the computer system 10 to access other computers and resources on a network. A mass storage device 26 allows the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, personal computer, workstation, mini-computer, mainframe computer and supercomputer.

Figure 2:
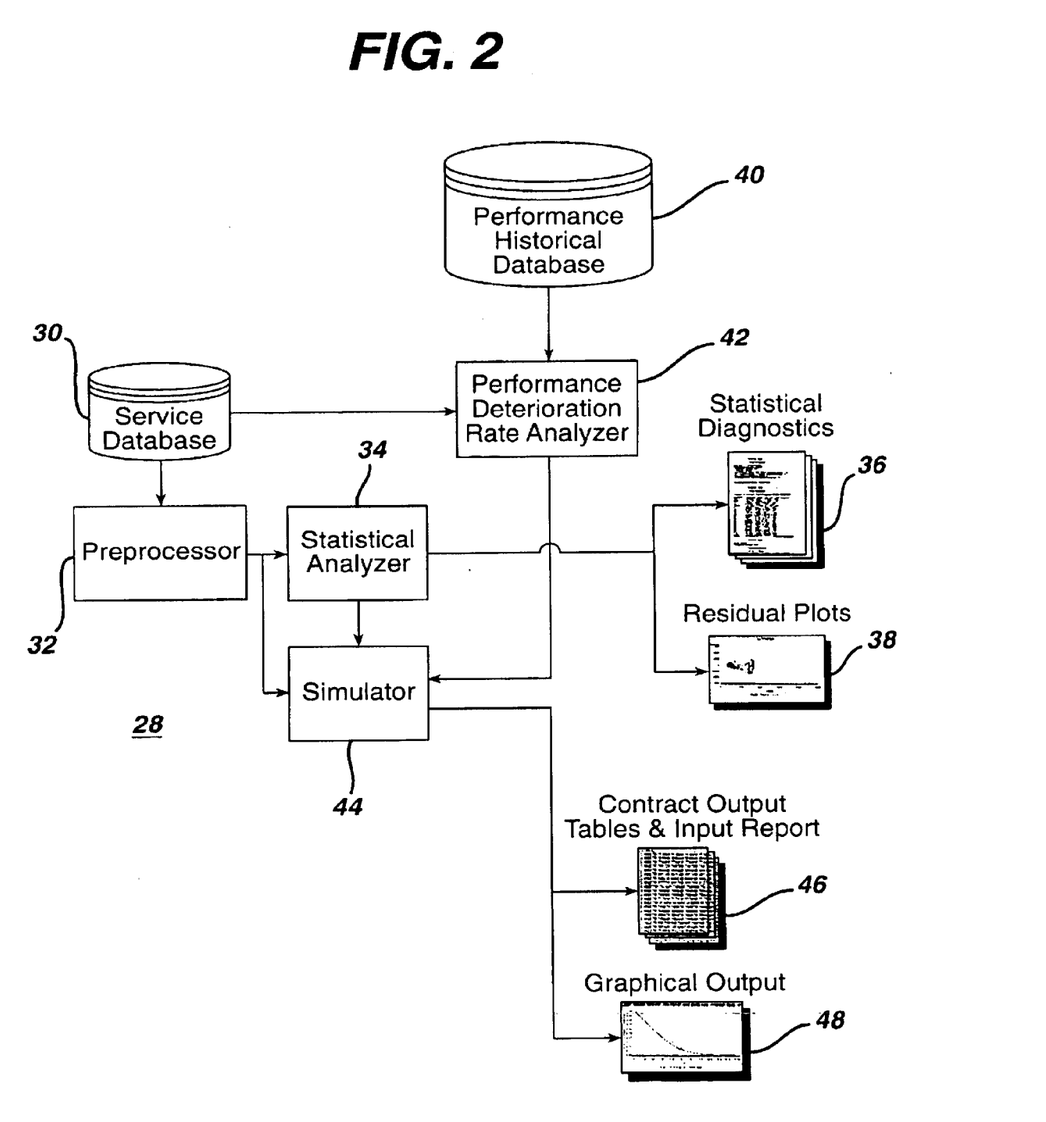
FIG. 2 shows a schematic diagram of a system for automatically predicting the timing and costs of future service events of a product that operates on the computer system shown in FIG. 1.

FIG. 2 shows a schematic diagram of a system 28 for automatically predicting the timing and costs of future service events of a product that operates on the computer system 10 shown in FIG. 1. In the system 28, a service database 30 stores a plurality of service information for the product. The plurality of service information varies depending on the product. Generally, the plurality of service information will comprise information such as compartment definitions of the product (i.e., a physical or performance related subsystem that is considered as a unit, which when it fails requires that the product needs maintenance or servicing), repair history of the product (e.g., dates of service events, types of service events, time for a compartment to fail, etc.), as well as any factors which may play a role in explaining the length of time which passes between service events (e.g., environment, operating conditions of the product, product configuration, equipment age, etc.). Other factors may include types of maintenance, cycle time of the product, usage of the product, contract terms and conditions, equipment age and vintage, etc. In this disclosure, the product will be described with reference to an aircraft engine; however, other products such as a power system, a locomotive or any other electrical, chemical or mechanical products, where it is desirable to predict the timing of future service events, may be used.

Referring to FIG. 2, a preprocessor 32 automatically processes the plurality of service information into a predetermined format. The preprocessing includes extracting the plurality of service information from the service database 30; assigning each data record in the database to a compartment depending upon the engineering labeled removal cause; creating new variables from existing variables (e.g., censoring variables, customer indicator variables), deleting outliers and producing summary statistics of the data set (e.g., number of records for each compartment). After performing these acts, the preprocessor 32 automatically generates a plurality of data files according to the service information, wherein each of these data files are formatted as SAS data sets.

A statistical analyzer 34 automatically analyzes the plurality of processed service information to determine a plurality of compartment failure information. The compartment failure information may include statistically significant compartment failure variables and the associated compartment time-to-failure coefficients. Compartment failure variables are variables that affect the time between service or maintenance events. For example, in the aircraft engine scenario, the thrust rating of the engine and the environment that the engine flies in are examples of possible statistically significant compartment failure variables. Compartment time-to-failure coefficients are coefficients that are applied to each of the compartment failure variables. The compartment failure variables and associated compartment time-to-failure coefficients are used to determine the time between servicing events for the compartments. In addition, the statistical analyzer 34 uses this information to determine which compartment failure variables influence service events and estimate time-to-failure distributions for the compartments.

The statistical analyzer 34 comprises several scripts that enable it to perform the aforementioned functions as well as some additional functions. One particular script that the statistical analyzer 34 uses is a service analysis script that executes a plurality of statistical procedures. The plurality of statistical procedures may comprise a multi-variate regression and/or a correlation analysis. Both the multi-variate regression and correlation can determine which compartment failure variables influence the timing of service events and estimate the time-to-failure distributions for the compartments. The statistical analyzer 34 uses other scripts to output this information as well as statistical diagnostics 36 and residual plots 38. The output from the multi-variate regression and/or correlation analysis may include the compartment time-to-failure coefficients for each compartment associated with the product. Other standard output from the multi-variate regression and/or correlation analysis may include a standard error associated with each of the compartment time-to-failure coefficients and a P value, which is an indication of whether a particular variable has a significant effect on the time between occurrences of service events.

Statistical diagnostics that may be outputted include goodness-of-fit metrics and collinearity diagnostics. These enable a user to determine the most appropriate compartment model in the statistical analyzer 34. Residual plots enable a user of the system 28 to determine how well the regression model fits the service information data. Generally, the residual plots are defined as the difference between the actual time until servicing values and the predicted time until servicing values. A small residual value is an indication that the regression or correlation analysis was a good fit, whereas a large residual value is an indication that the fit may be improved.

In addition to residual plots, the statistical analyzer 34 may use another script to output information such as probability plots, which enables one to assess whether the assumed life distribution for each compartment is appropriate or not. Another script may be used to generate a plot of residuals versus each variable that affects the time that a service event occurs.

Referring again to FIG. 2, the system 28 also comprises a performance historical database 40 that includes a plurality of performance information obtained from the product while in operation. As mentioned above, this disclosure is described with reference to an aircraft engine. Therefore, the performance information can be acquired by using any of a plurality of data acquisition devices such as sensors and transducers. After the data have been obtained, the data acquisition devices can transfer the data to a remote monitoring facility for storage and evaluation. Also, it is possible to have the data from the data acquisition devices manually recorded and entered into the performance historical database 40. The plurality of performance information includes but is not limited to information such as performance characteristic values (e.g., exhaust gas temperature, EGT), initial data levels after servicing, current data levels, dates at which the product is serviced, and variables that affect the servicing of a subset of compartments of the product. For this aircraft engine embodiment, the variables may include flight leg, engine thrust, customer, engine model, engine series, etc. All of this performance information is described below in more detail.

A performance deterioration rate analyzer 42 automatically analyzes the performance characteristic values of the product from both the plurality of service information and performance information. The performance deterioration rate analyzer 42 comprises a statistical analysis script that relates a subset of compartments of the product according to time. For purposes of describing the performance deterioration rate analyzer 42, time is the amount of time that the aircraft engine is in use. Time can be measured by variables such as cycles or hours. The statistical analysis script generates an estimated deterioration rate curve for a subset of compartments of the product. The performance deterioration rate analyzer 42 further comprises a transformer that transforms each estimated deterioration rate curve for a compartment to a performance life distribution. A performance life distribution is a statistical distribution representing the statistical properties of the time between servicing events and is estimated using performance data as opposed to service data. The performance life distribution is in the same form as the estimated time-to-failure distributions for the compartments determined by the statistical analyzer 34.

A simulator 44 automatically simulates the future service events of the product according to the plurality of compartment failure information generated by the statistical analyzer 34 and the performance life distribution generated by the performance deterioration rate analyzer 42. The simulation results in a forecast of the timing and costs of the future service events. In particular, the simulator 44 takes the compartment time-to-failure coefficients from the statistical analyzer 34 and determines a Weibull distribution for each compartment defined for the product. Also, the simulator 44 takes the performance life distribution from the performance deterioration rate analyzer 42 and determines a Weibull distribution for each of the associated compartments defined for the product. The simulator 44 then uses the compartment distributions to determine the overall distribution for the product. Generally, the simulator uses a discrete event-driven Monte Carlo simulation to perform the above operations. After performing the simulation, the simulator 44 generates several outputs. For instance, one output is the contract output 46, which typically comprises the following: maintenance event distribution parameters over time; maintenance cost distributions over time by cost category (e.g., material cost versus labor cost); demand distributions spare/leased equipment; and equipment performance distributions (e.g., aircraft engine time on wing). The simulator 44 is not limited to these outputs and it is possible to use other outputs if desired.

In order to understand the performance of the simulator 44, the system 28 uses a validator, which can be part of the statistical analyzer 34 or the simulator or separate from both. The validator contains a validation script prepared for a case study done for the product. For purposes of this disclosure, a case study is defined as any subset of historical service event data that is used for model validation. For example, the service events that took place on a group of randomly chosen systems over the past year may serve as a case study, and during validation, a comparison is made between the number of service events projected by the model for these systems over this period of time and the actual number of service events that took place. The validation script will automatically compare the compartment distributions determined by the simulator 44 to the distributions that actually happened in the case study. After making the comparison, the validator generates a series of graphical outputs 48 on availability and reliability. In a preferred embodiment, three sets of reliability graphs are generated. The first set of reliability graphs are relative frequency histograms of the actual compartment distributions for each of the first four shop visits for the case study. Overlaid on these relative frequency histograms are the compartment distributions determined by the simulator 44. The second set of reliability graphs are relative frequency histograms of the actual system level distributions for each of the first four shop visits for the case study. Overlaid on each of these relative frequency histograms are the system distributions determined by the simulator 44. The third set of reliability graphs are non-parametric Kaplan-Meier estimated survival curves determined from both the actual system level distribution and the system level distribution determined by the simulator 44 for each of the first four shop visits. From these outputs, a user can generate a service plan forecast for the product that comprises time for scheduling service events. In addition, other life cycle forecast information can be determined such as a service contract monitoring program for monitoring the service events listed in a contract, a shop load planning schedule for planning for the future service events of the product, a production planning schedule for scheduling the production of new products, and an inventory management schedule to ensure that there is an inventory of parts to perform the scheduled service events.

Figure 3:
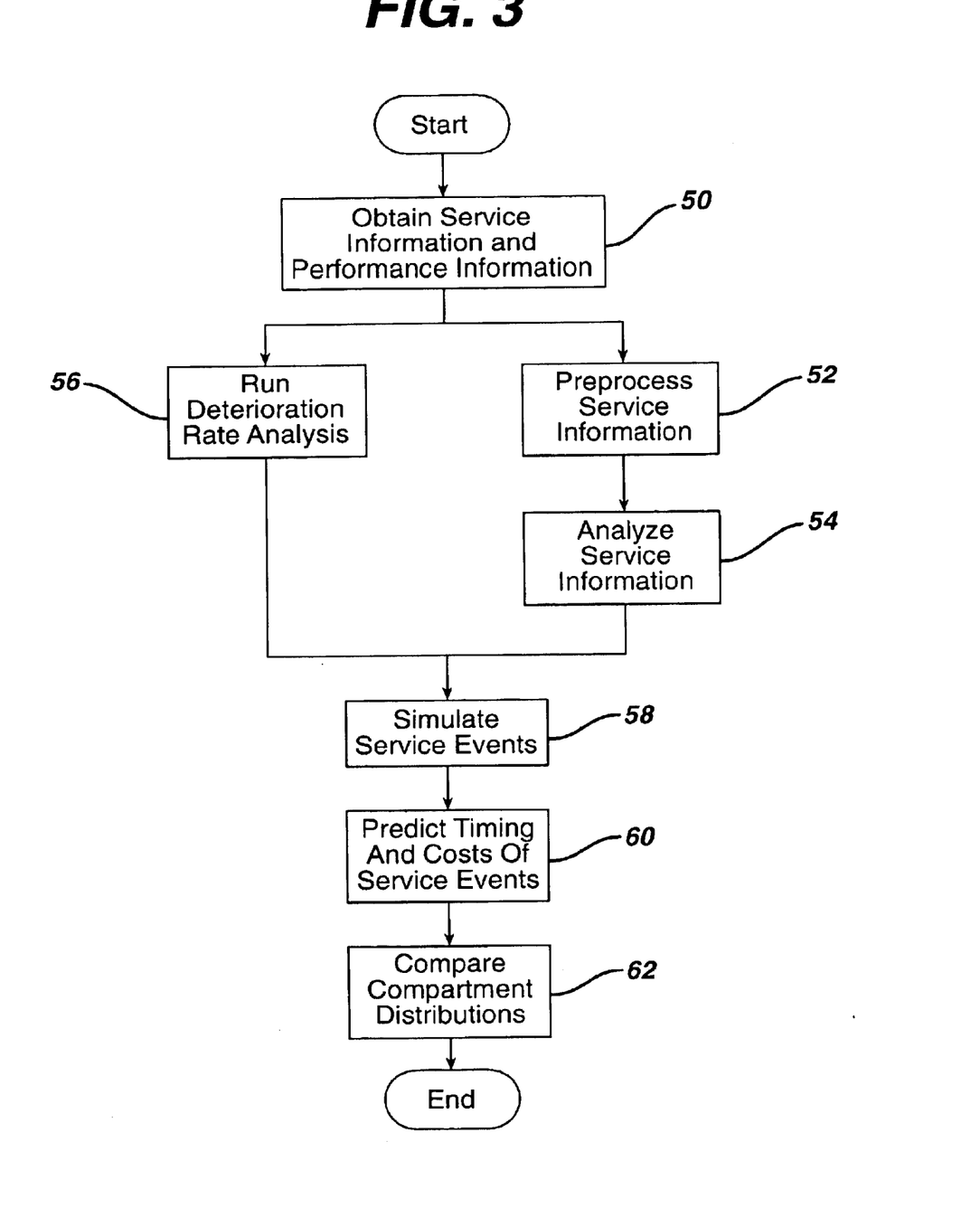
FIG. 3 shows a flow chart describing actions performed by the system shown in FIG. 2.

FIG. 3 shows a flow chart describing actions performed by the system 28 shown in FIG. 2. At block 50, a plurality of service information and performance information for the product stored in the service database and the performance historical database, respectively, are obtained. The preprocessor automatically preprocesses the plurality of service information into a predetermined format at 52. The statistical analyzer automatically analyzes the plurality of processed service information to determine a plurality of compartment failure information at 54. In particular, the statistical analyzer determines both the compartment time-to-failure coefficients and the compartment failure variables using the aforementioned statistical procedures. The statistical analyzer outputs the compartment time-to-failure coefficients and the compartment failure variables to the simulator and generates various residual plots.

At the same time the service information is being preprocessed and analyzed by the preprocessor and the statistical analyzer, the performance information is simultaneously evaluated by the performance deterioration rate analyzer. If desired, it is also possible to have the performance information preprocessed in a manner similar to the service information. Regardless of whether the performance information is preprocessed, the performance deterioration rate analyzer automatically runs a deterioration rate analysis at 56. As mentioned above, the deterioration rate analysis generates an estimated deterioration rate curve for a subset of compartments of the product and transforms each estimated deterioration rate curve to a performance life distribution.

After analyzing the service information and the performance information, the simulator automatically simulates the future service events of the product according to the compartment failure information and the performance life distribution at 58. In addition, the simulator forecasts or predicts the timing and costs of the future service events at 60. As mentioned above, this information is in the form of distributions for each compartment that makes up the product. The validator compares the compartment distributions determined by the simulator to the distributions that actually happened in the case study at 62. After making the comparison, the validator generates a series of graphical outputs on availability and reliability.

Figure 4:
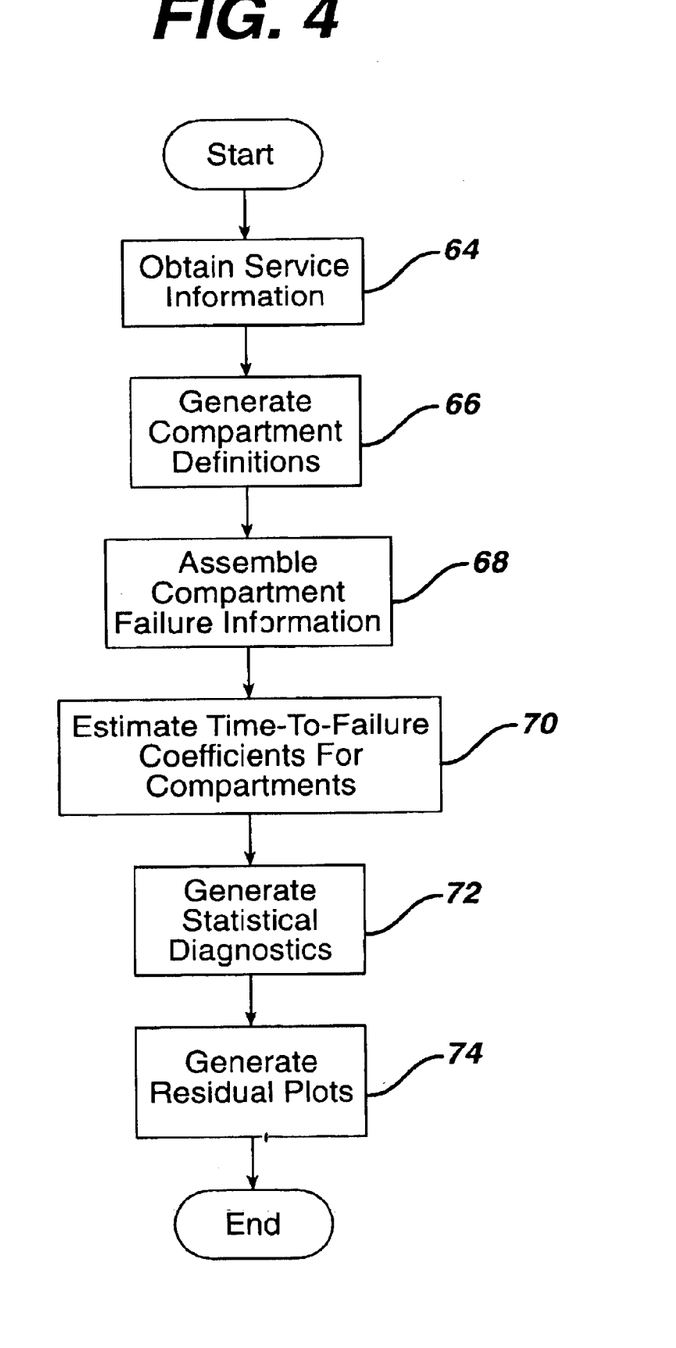
FIG. 4 shows a flow chart describing the actions performed by the statistical analyzer shown in FIG. 2.

FIG. 4 shows a flow chart describing the actions performed by the statistical analyzer shown in FIG. 2. At block 64, the statistical analyzer obtains the service information from the preprocessor. The statistical analyzer then generates compartment definitions for the service information at 66. At 68, the statistical analyzer determines compartment failure information such as the statistically significant compartment failure variables and their associated compartment time-to-failure coefficients using the aforementioned statistical procedures. The statistical analyzer then applies the compartment time-to-failure coefficients to the compartment failure variables at 70. At block 72, the statistical analyzer generates the various statistical diagnostics for each compartment associated with the product. At block 74, the statistical analyzer generates residual plots and probability plots and other types of plots if desired. As mentioned above, the statistical analyzer can generate other information such as standard errors associated with each of the compartment time-to-failure coefficients and a P value.

Figure 5:
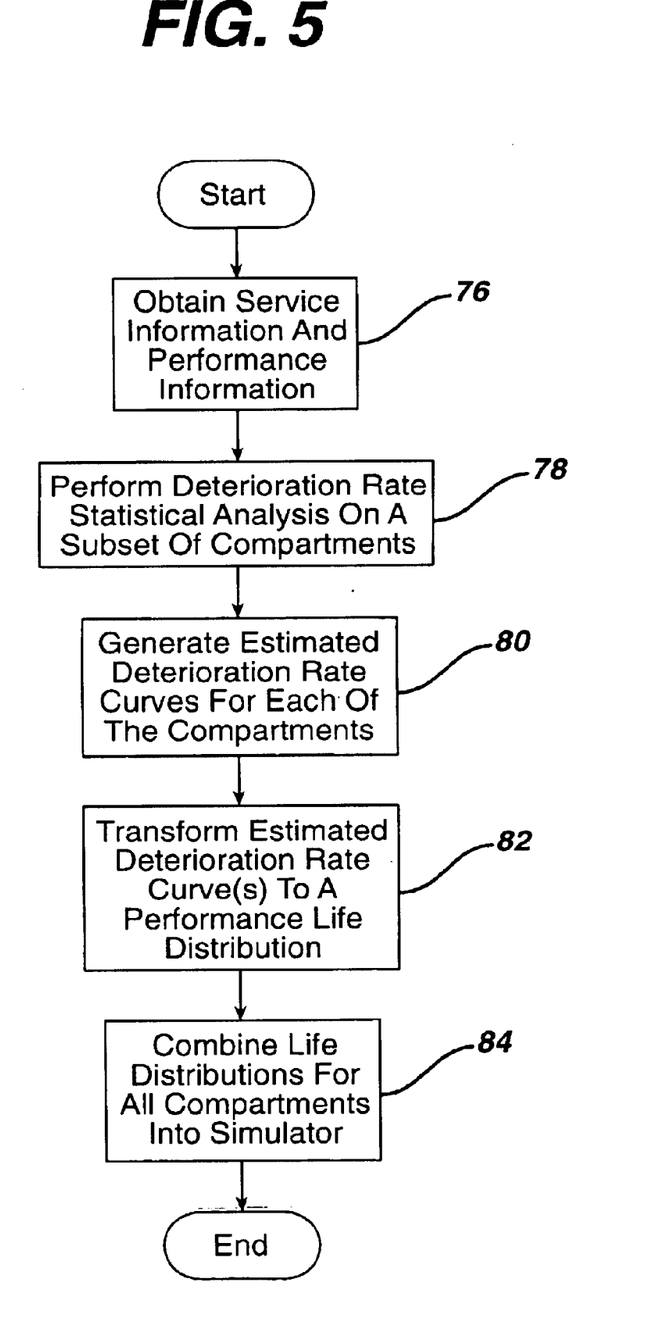
FIG. 5 shows a flow chart describing the actions performed by the performance deterioration rate analyzer shown in FIG. 2.

FIG. 5 shows a flow chart describing the actions performed by the performance deterioration rate analyzer 42 shown in FIG. 2. Before running the deterioration rate analysis, the performance deterioration rate analyzer first obtains the plurality of service information and performance information from the service database and the performance historical database, respectively, at 76. As mentioned earlier, the plurality of performance information includes information such as performance characteristic values, initial data levels after servicing, current data levels, dates at which the product is serviced, and variables that affect the servicing of each compartment of the product.

Figure 6A:
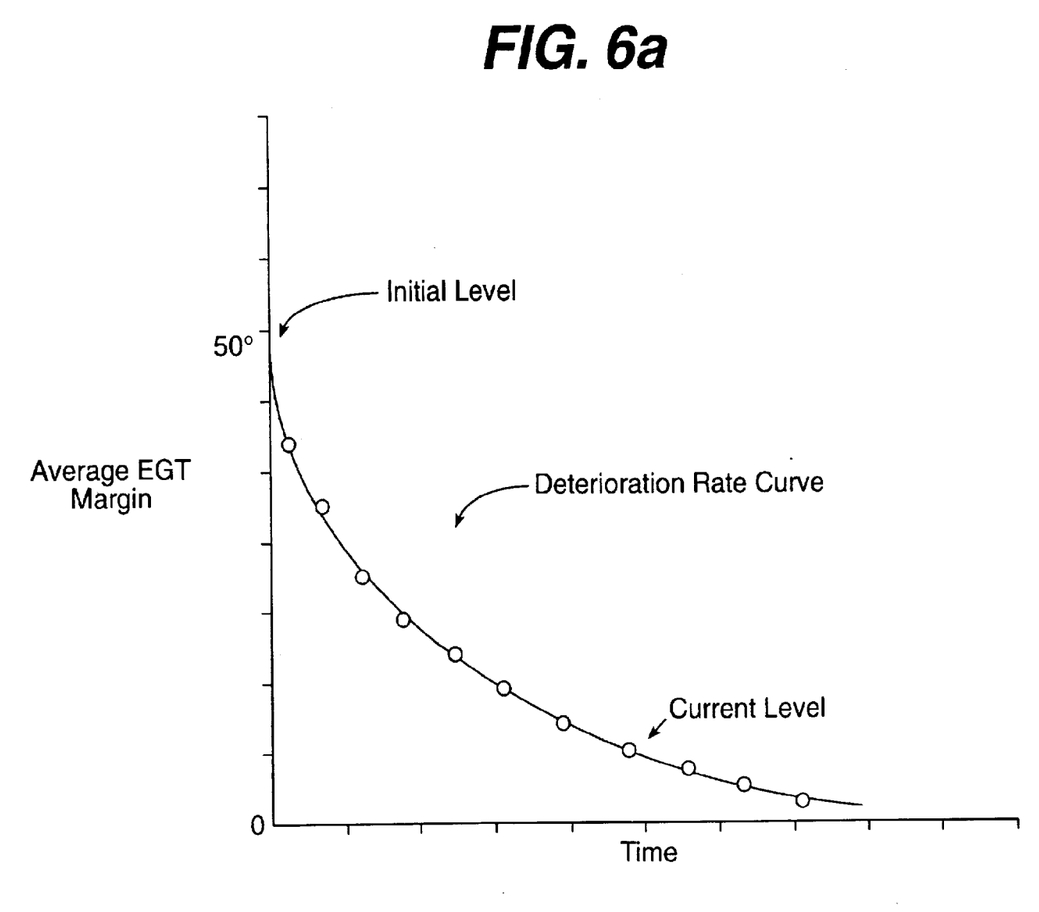
FIGS. 6a–6b show examples of plots that describe some of the performance information stored in the performance historical database shown in FIG. 2.
Figure 6B:
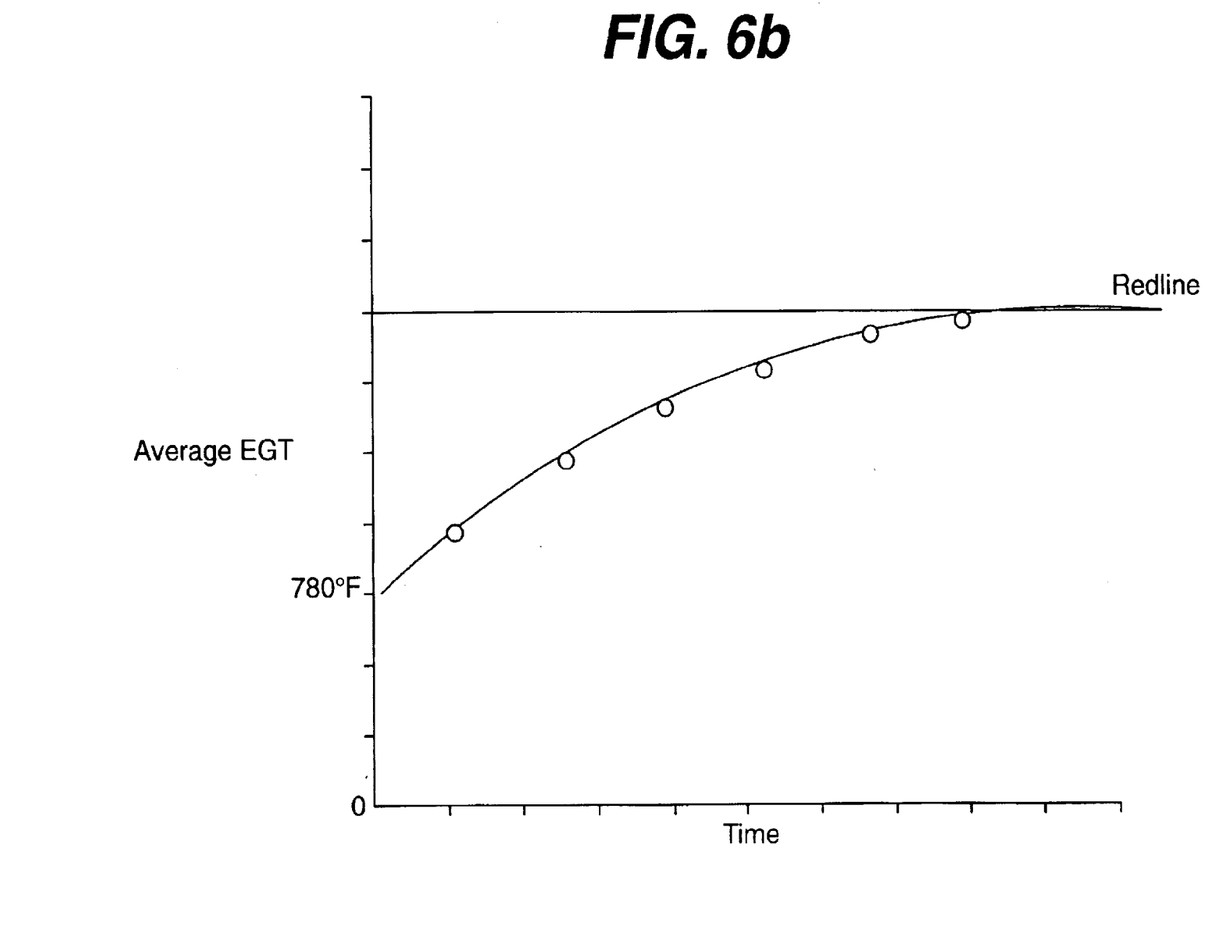

FIGS. 6a–6b show examples describing some of the above-mentioned performance information. In particular, FIG. 6a shows an example of a deterioration rate curve for a compartment of an aircraft engine. In this example, the compartment is EGT, however, other compartments could be used. For instance, an illustrative but non-exhaustive list could include delta exhaust gas temperature (dEGT), which is the deviation from the baseline EGT, fuel flow (WF), core speed (N2), and EGT divergence, divEGT, which is the difference of the EGT between the raw EGT of the engine in question and the mean of raw EGT of all engines. The deterioration curve shows the degradation of the compartment over time. Eventually, after a period of time, the compartment reaches a level that the degradation is severe enough to warrant servicing. The initial data level performance parameter is the initial level of the compartment after being serviced. In FIG. 6a, the initial level is about 50° F., and over time the level of the EGT margin will degrade. The historical trending levels are shown in FIG. 6a as data points. FIG. 6b shows an example of the raw EGT levels. In particular, FIG. 6b shows a plot illustrating the removal level or redline for the EGT compartment. The removal level indicates an absolute time that the compartment reaches a predetermined level that necessitates the removal of the aircraft engine for servicing.

Referring back to FIG. 5, after the service information and the performance information are obtained, the performance deterioration rate analyzer executes the statistical analysis script that relates each compartment of the product according to time at 78. Preferably, the statistical analysis runs a multi-variate regression analysis for each compartment of the product to identify variables that influence the time between servicing events. An illustrative example of a multi-variate regression analysis using a Weibull distribution is presented. The time (specified either in engine flight hours or engine cycles) between service events is represented as Y. As mentioned earlier, thrust (X1) and flight leg (X2) are two compartment failure variables that might influence the time between service events, Y. The multi-variate Weibull regression model takes the form:

$$ln(Y)=\alpha+\beta_1 X1+\beta_2 X2+\sigma\epsilon,$$

where ln is the natural log function, $\epsilon$ is an error term which follows the smallest extreme value distribution, and $\alpha$, $\beta_1$, $\beta_2$, and $\sigma$ are compartment failure variables to be estimated from the service data.

For fixed values of thrust (X1) and flight leg (X2), a Weibull distribution representing time between servicing events may be determined. For example, if $\alpha=8.9$, $\beta_1=-0.00003$, $\beta_2=0.75$, and $\sigma=0.5$ where X1=23500 and X2=1.8, the Weibull distribution of the time between servicing events for this compartment would have a location (or scale) parameter (i.e., the $63.2^{nd}$ failure percentile) of exp(8.9−0.00003*23500+0.75*1.8)=13975 and a shape parameter equal to $1/\sigma 1/0.50=2.0$. Although a Weibull regression analysis is described, other statistical analyses such as multiple non-linear and loglinear analyses could also be used.

The performance deterioration rate analyzer generates estimated deterioration rate curves for a subset of compartments of the product at 80. The estimated deterioration rate curves are determined using a multi-variate regression and/or correlation statistical analysis. Denote the performance characteristic (e.g., EGT margin) as Y. One example of a multi-variate regression and/or correlation analysis is presented using Y and time (as measured in cycles) in the following model:

$$Y=\alpha+\beta_1 Cycles+\epsilon$$

where $\epsilon$ follows a normal distribution and $\alpha$ and $\beta_1$ are variables to be estimated from the performance and service information data. The estimate of $\beta_1$ in this example is an estimated rate of deterioration for the performance characteristic, Y. For example, if $\beta_1$=0.003 then the performance characteristic, Y, deteriorates at approximately 3 degrees per 1000 cycles.

Next, the performance deterioration rate analyzer transforms each estimated deterioration rate curve for the respective compartment to a performance life distribution at 82. The performance life distribution is characterized by a location (or scale) parameter and a shape parameter. In order to perform the transformation, estimates of $\alpha$, $\beta_1$, and a performance characteristic limit value (i.e., a value at which the compartment requires servicing) which is denoted by EGTL, are required. The location (or scale) parameter of the performance life distribution is obtained using the following formula:

$$\text{Location} = \exp\left(\frac{\ln\left(\frac{EGTL - \alpha}{\beta_1}\right) * \ln(-\ln(1 - 0.825)) - \ln\left(\frac{EGTL - \alpha}{\beta_1 - \beta_1/3}\right) * \ln(-\ln(1 - 0.50))}{\ln(-\ln(1 - 0.825)) - \ln(-\ln(1 - 0.5))}\right)$$

The shape parameter of the performance life distribution is obtained using the following formula:

$$\text{Shape} = \frac{\ln(-\ln(1 - 0.825))}{\ln\left(\frac{EGTL - \alpha}{\beta_1 - \beta_1/3}\right) - \ln(\text{Location})}.$$

As an example, suppose the estimate of $\alpha$ is 0, the estimate of $\beta_1$=0.003 and the performance characteristic value is 60. Using the formula above, the location parameter value is estimated to be 23498. The shape parameter is estimated to be 2.27. This approach of determining the performance life distribution is illustrative of one way of making this determination, and is not exhaustive of other approaches. The performance life distributions for all compartments are then transferred to the simulator at 84.

Figure 7:
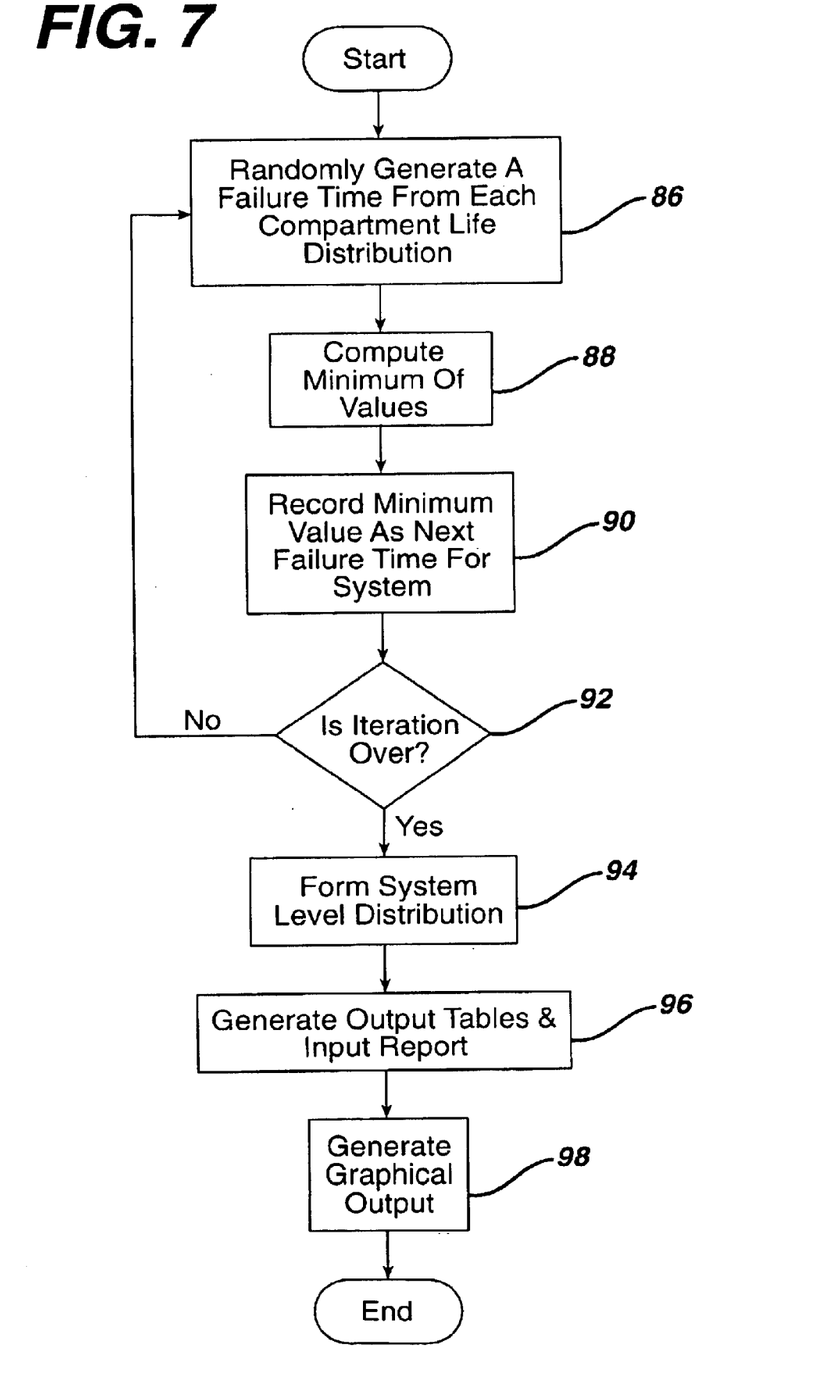
FIG. 7 shows a flow chart describing the actions performed by the simulator shown in FIG. 2.

FIG. 7 shows a flow chart describing the actions performed by the simulator 44 shown in FIG. 2. As mentioned earlier, the simulator 44 is interested in determining the distribution of failures at the product's system level so that the timeliness and costs of future service events can be predicted. The simulator 44 is able to determine the distribution of failures at the product's system level because of the information provided by the statistical analyzer 34 and the performance deterioration rate analyzer 42. The information (i.e., time-to-failure coefficients and compartment variables) provided by the statistical analyzer 34 facilitates an understanding of each of the compartments that make up the product's system level and their relationship with each other, while the performance life distributions provided by the performance deterioration rate analyzer gives more information about probable service requirements. The simulator 44 uses this information to examine the system or aggregate level and predict the overall timing and costs of service events for the product. Referring back to FIG. 7, the actions performed by the simulator begin at block 86, where random failure times (i.e., service events) for each compartment distribution are generated. From the randomly generated failure times, the minimum of these values is found at 88. The simulator designates $t_i$ as the minimum time, where i is the compartment associated with this time value. The simulator then records the minimum time $t_i$ as the next failure time (i.e., time for a service event) for the system level at 90. At 92, the simulator determines whether there are any more system level failures needed. If so, then blocks 86–90 are repeated a large number of times. Once all of the iterations have been performed, the simulator forms a system level distribution from the failure times at 94. At 96, the simulator generates the output tables and the input report, while a graphical output is generated at 98.

Figure 8:
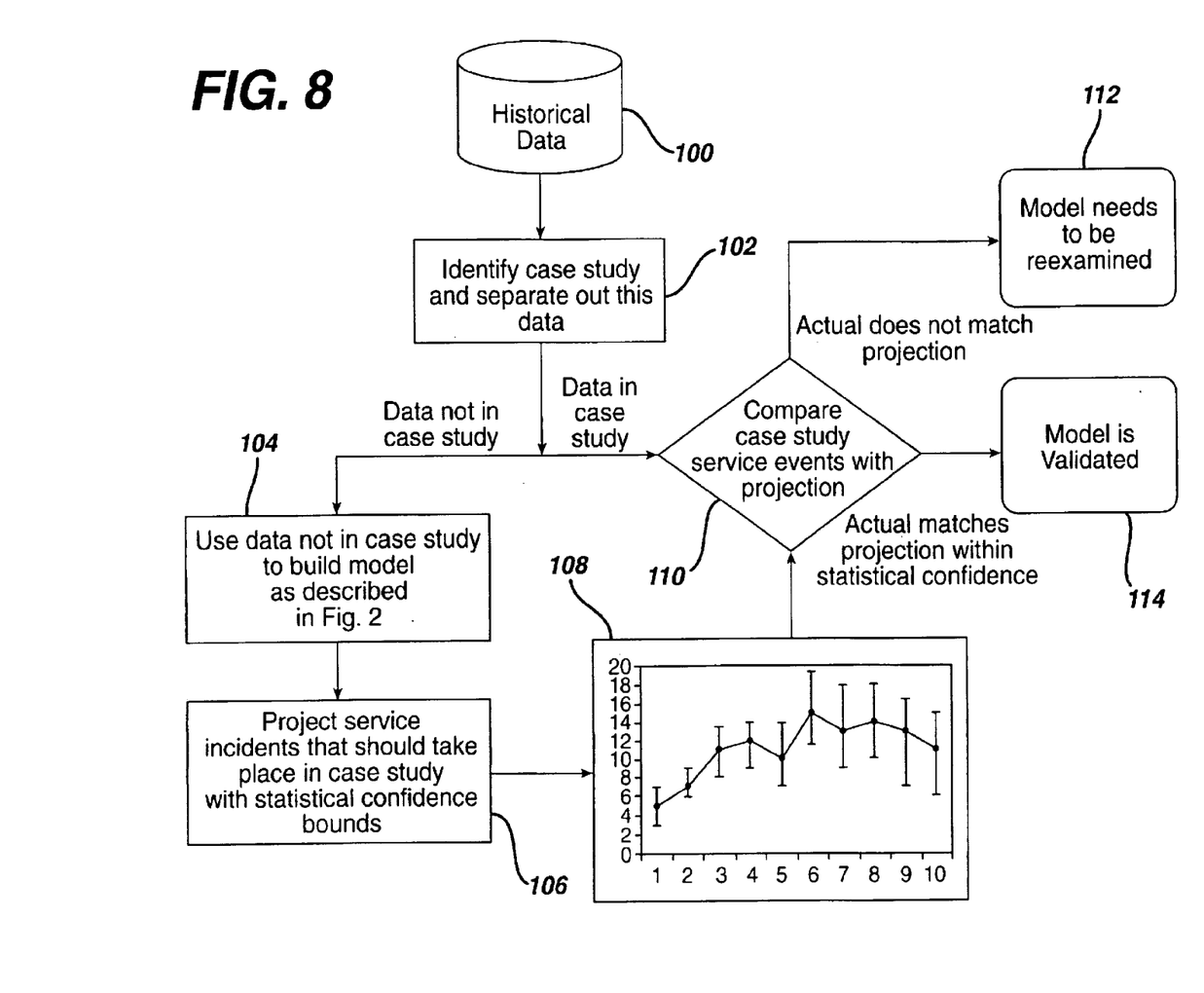
FIG. 8 shows a flow diagram describing the validating actions performed by the system shown in FIG. 2.

FIG. 8 shows a flow diagram describing the validating actions performed by the system shown in FIG. 1. In this diagram, historical service event data and the performance historical data are stored in a database at 100. After identifying a case study, the historical service event data and performance historical data are separated out according to the case study at 102. If the historical service event data and performance historical data are not in the case study, then these data are used to build a model as described in FIG. 2 at 104. Project service incidents along with statistical confidence bounds that should take place in the case study are determined at 106. An example of the project service incidents along with statistical confidence bounds are shown at 108. The service incidents are compared to data that are used in the case study at 110. If the actual data do not match the projection, then the model needs to be reexamined as noted at 112. On the other hand, if the data do match the projection within the statistical confidence bounds, then the model is validated as noted at 114.

The foregoing flow charts of this disclosure show the architecture, functionality, and operation of a possible implementation of the system for automatically predicting the timing and costs of future service events of a product. In this regard, each block represents a module, segment, or portion of code, which comprises one or more executable instructions for implementing the specified logical function (s). It should also be noted that in some alternative implementations, the functions noted in the blocks may occur out of the order noted in the figures, or for example, may in fact be executed substantially concurrently or in the reverse order, depending upon the functionality involved.

The above-described system and method for automatically predicting the timing and costs of future service events of a product comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be, for example but not limited to, an electronic, magnetic, optical, electromagnetic, infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

In the preferred embodiment of this disclosure, the above-described system and method for automatically predicting the timing and costs of future service events of a product uses UNIX-based software that interacts with Oracle databases to input and output data. Other operating system software such as Linux can be used with the teachings of this disclosure as well other databases such as Microsoft SQL Server, Microsoft Access and Sybase. In addition, elements such as the preprocessor 32 and simulator 44 are written in C++, however, other languages such as Java, Ada and Visual Basic can be used. The statistical analyzer 34 and performance deterioration rate analyzer 42 uses applications such as SAS, however, other statistical analysis applications such as Splus and Minitab can be used.

It is apparent that there has been provided in accordance with this invention, a system and method for automatically predicting the timing and costs of future service events of a product. While the invention has been particularly shown and described in conjunction with a preferred embodiment thereof, it will be appreciated that variations and modifications can be effected by a person of ordinary skill in the art without departing from the scope of the invention.

What is claimed is:

1. An automated system for predicting the timing and costs of future service events in a life cycle of a product formed from a plurality of compartments, comprising:
   a database that contains a plurality of service information and a plurality of performance information for the product;
   a statistical analyzer that automatically analyzes the plurality of service information to determine a plurality of compartment failure information comprising compartment failure variables and compartment time-to-failure coefficients, wherein the statistical analyzer uses the plurality of compartment failure information to determine which compartment failure variables influence the timing of future service events and estimate time-to-failure distributions for the plurality of compartments;
   a performance deterioration rate analyzer that automatically analyzes performance deterioration rate of the product from the plurality of service information and performance information, wherein the performance deterioration rate analyzer comprises a statistical analysis script that relates a subset of compartments of the product according to time, wherein the statistical analysis script generates an estimated deterioration rate curve for the subset of compartments of the product, wherein the performance deterioration rate analyzer further comprises a transformer that transforms each estimated deterioration rate curve for a compartment to a performance life distribution; and
   a simulator that automatically simulates a distribution of future service events in the life cycle of the product and predicts the costs of the service events according to the time-to-failure distributions and performance life distributions.

2. The system according to claim 1, wherein the database comprises a service database and a performance historical database.

3. The system according to claim 1, wherein the plurality of service information comprises compartment definitions, repair history and service factors.

4. The system according to claim 1, wherein the plurality of performance information comprises performance characteristic values, initial data levels after servicing, current data levels, dates at which the product is serviced, and variables that affect the servicing of a subset of the plurality of compartments.

5. The system according to claim 1, further comprising a preprocessor that automatically processes the plurality of service information into a predetermined format.

6. The system according to claim 5, wherein the preprocessor generates a plurality of data files according to the plurality of service information.

7. The system according to claim 1, wherein the statistical analyzer uses the estimated time-to-failure distributions to determine a Weibull distribution for a subset of the plurality of compartments defined for the product.

8. The system according to claim 1, wherein the statistical analyzer comprises a service analysis script that executes a plurality of statistical procedures.

9. The system according to claim 8, wherein the plurality of statistical procedures comprise a multivariate regression and/or a correlation analysis.

10. The system according to claim 8, wherein the service analysis script generates a plurality of statistical diagnostic information.

11. The system according to claim 10, wherein the plurality of statistical diagnostic information comprises goodness-of-fit metrics and collinearity diagnostics.

12. The system according to claim 8, wherein the service analysis script generates a plurality of residual plots.

13. The system according to claim 1, wherein the statistical analyzer comprises a validation script.

14. The system according to claim 13, wherein the validation script is applied to a plurality of case studies set up for the product.

15. The system according to claim 1, wherein the simulator uses the performance life distributions to determine a Weibull distribution for a subset of the plurality of compartments defined for the product.

16. The system according to claim 1, wherein the simulator forecasts a service plan for the future service events that comprises the time for scheduling the service events and the costs associated therewith.

17. An automated system for predicting the timing and costs of future service events in a life cycle of a product formed from a plurality of compartments, comprising:
   means for storing a plurality of service information and a plurality of performance information for the product;
   means for automatically analyzing the plurality of service information to determine a plurality of compartment failure information comprising compartment failure variables and compartment time-to-failure coefficients, wherein the analyzing means uses the plurality of compartment failure information to determine which compartment failure variables influence the timing of future service events and estimate time-to-failure distributions for the compartments;
   means for automatically performing a deterioration rate analysis that determines performance deterioration rate of the product from the plurality of service information and performance information, wherein the performing means comprises a statistical analysis script that relates a subset of the plurality of compartments of the product according to time, wherein the statistical analysis script generates an estimated deterioration rate curve for a subset of the plurality of compartments of the product, wherein the performing means further comprises means for transforming each estimate deterioration rate curve for a compartment to a performance life distribution; and means for automatically simulating a distribution of future service events in the life cycle of the product and predicting the costs of the service events according to the time-to-failure distributions and performance life distributions.

18. Tho system according to claim 17, wherein the plurality of service information comprises compartment definitions, repair history and service factors.

19. The system according to claim 17, wherein the plurality of performance information comprises performance characteristic values, initial data levels after servicing, current data levels, dates at which the product is serviced, and variables that affect the servicing of a subset of the plurality of compartments of the product.

20. The system according to claim 17, further comprising means for automatically preprocessing the plurality of service information into a predetermined format.

21. The system according to claim 20, wherein the preprocessing means generates a plurality of data files according to the plurality of service information.

22. The system according to claim 17, wherein the analyzing means uses the estimated time-to-failure distributions to determine a Weibull distribution for a subset of the plurality of compartment defined for the product.

23. The system according to claim 17, wherein the analyzing means comprises a service analysis script that executes a plurality of statistical procedures.

24. The system according to claim 23, wherein the plurality of statistical procedures comprise a multivariate regression and/or a correlation analysis.

25. The system according to claim 23, wherein the service analysis script generates a plurality of statistical diagnostic information.

26. The system according to claim 25, wherein the plurality of statistical diagnostic information comprises goodness-of-fit metrics and collinearity diagnostics.

27. The system according to claim 23, wherein the service analysis script generates a plurality of residual plots.

28. The system according to claim 17, wherein the analyzing means comprises a validation script.

29. The system according to claim 28, wherein the validation script is applied to a plurality of case studies set up for the product.

30. The system according to claim 17, wherein the simulating means uses the performance life distribution to determine a Weibull distribution for a subset of the plurality of compartments defined for the product.

31. The system according to claim 17, wherein the simulating means forecasts a service plan for the future service events that comprises the time for scheduling the service events and the costs associated therewith.

32. A method for automatically predicting the timing and costs of future service events in a life cycle of a product formed from a plurality of compartments, comprising:

storing a plurality of service information and a plurality of performance information for the product;

automatically analyzing the plurality of service information to determine a plurality of compartment failure information comprising compartment failure variables and compartment time-to-failure coefficients, wherein the analyzing uses the plurality of compartment failure information to determine which compartment failure variables influence the timing of future service events and estimate time-to-failure distributions for the plurality of compartments;

automatically performing a deterioration rate analysis that determines performance deterioration rate of the product from the plurality of service information and performance information, wherein the performing comprises using a statistical analysis script that relates a subset of the plurality of compartments of the product according to time, wherein the statistical analysis script generates an estimated deterioration rate curve for a subset of the plurality of compartments of the product, wherein the performing a deterioration rate analysis further comprises transforming each estimated deterioration rate curve for a compartment to a performance life distribution; and automatically simulating a distribution of future service events in the life cycle of the product and predicting the costs of the service events according to the time-to-failure distributions and performance life distributions.

33. The method according to claim 32, wherein the plurality of service information comprises compartment definitions, repair history and service factors.

34. The method according to claim 32, wherein the plurality of performance information comprises performance characteristic values, initial data levels after servicing, current data levels, dates at which the product is serviced, and variables that affect the servicing of a subset of the plurality of compartments of the product.

35. The method according to claim 32, further comprising automatically preprocessing the plurality of service information into a predetermined format.

36. The method according to claim 35, wherein the preprocessing generates a plurality of data files according to the plurality of service information.

37. The method according to claim 32, wherein the analyzing uses the estimated time-to-failure distributions to determine a Weibull distribution for a subset of the plurality of compartments.

38. The method according to claim 32, wherein the analyzing comprises using a service analysis script that executes a plurality of statistical procedures.

39. The method according to claim 38, wherein the plurality of statistical procedures comprise a multivariate regression and/or a correlation analysis.

40. The method according to claim 39, wherein the service analysis script generates a plurality of statistical diagnostic information.

41. The method according to claim 40, wherein the plurality of statistical diagnostic information comprises goodness-of-fit metrics and collinearity diagnostics.

42. The method according to claim 38, wherein the service analysis script generates a plurality of residual plots.

43. The method according to claim 32, wherein the analyzing comprises a validation script.

44. The method according to claim 43, wherein the validation script is applied to a plurality of case studies set tip for the product.

45. The method according to claim 32, wherein the simulating uses the performance life distributions to determine a Weibull distribution for a subset of the plurality of compartments.

46. The method according to claim 32, wherein the simulating forecasts a service plan for the future service events that comprises the time for scheduling the service events and the costs associated therewith.

47. A computer-readable medium storing computer instructions for instructing a computer system to automatically predict the timing and costs of future service events in a life cycle of a product formed from a plurality of compartments, the computer instructions comprising:

storing a plurality of service information and a plurality of performance information for the product;

automatically analyzing the plurality of service information to determine a plurality of compartment failure information comprising compartment failure variables and compartment time-to-failure coefficients, wherein the analyzing instructions uses the plurality of compartment failure information to determine which compartment failure variables influence the timing of future service events and estimate time-to-failure distributions for the plurality of compartments;

automatically performing a deterioration rate analysis that determines performance deterioration rate of the product from the plurality of service information and performance information, wherein the performing instructions comprise a statistical analysis script that relates a subset of the plurality of compartments of the product according to time, wherein the statistical analysis script a generates an estimated deterioration rate curve for a subset of the plurality of compartments of the product, wherein the performing instructions further comprise transforming instructions that transform each estimated deterioration rate curve to a performance life distribution; and automatically simulating a distribution of future service events in the life cycle of the product and predicting the costs of the service events according to the time-to-failure distribution and performance life distributions.

48. The computer-readable medium according to claim 47, wherein the plurality of service information comprises compartment definitions, repair history and service factors.

49. The computer-readable medium according to claim 47, wherein the plurality of performance information comprises performance characteristic values, initial data levels after servicing, current data levels, dates at which the product is serviced, and variables that affect the servicing of a subset of the plurality of compartments of the product.

50. The computer-readable medium according to claim 47, further comprising preprocessing instructions that automatically preprocess the plurality of service information into a predetermined format.

51. The computer-readable medium according to claim 50, wherein the preprocessing instructions generates a plurality of data files according to the plurality of service information.

52. The computer-readable medium according to claim 47, wherein the analyzing instructions use the estimated time-to-failure distributions to determine a Weibull distribution for a subset of the plurality of compartments.

53. The computer-readable medium according to claim 47, wherein the analyzing instructions comprises instructions for using a service analysis script that executes a plurality of statistical procedures.

54. The computer-readable medium according to claim 53, wherein the plurality of statistical procedures comprise a multivariate regression and/or a correlation analysis.

55. The compute-readable medium according to claim 54, wherein the service analysis script generates a plurality of statistical diagnostic information.

56. The computer-readable medium according to claim 55, wherein the plurality of statistical diagnostic information comprises goodness-of-fit metrics and collinearity diagnostics.

57. The computer-readable medium according to claim 53, wherein the service analysis script generates a plurality of residual plots.

58. The computer-readable medium according to claim 47, wherein the analyzing instructions comprise a validation script.

59. The computer-readable medium according to claim 58, wherein the validation script is applied to a plurality of case studies set up for the product.

60. The computer-readable medium according to claim 47, wherein the simulating instructions use the performance life distribution to determine a Weibull distribution for a subset of the plurality of compartments.

61. The computer-readable medium according to claim 47, wherein the simulating instructions forecasts a service plan for the future service events that comprises the time for scheduling the service events and the costs associated therewith.

* * * * *